United States Patent
Ray et al.

[11] Patent Number: 5,960,343
[45] Date of Patent: *Sep. 28, 1999

[54] MOBILE COMMUNICATIONS

[75] Inventors: Jimmy C. Ray, Denison, Tex.; Dan McKenna, Boulder, Colo.

[73] Assignee: Aircell, Inc., Louisville, Colo.

[*] Notice: This patent is subject to a terminal disclaimer.

[21] Appl. No.: 08/701,837

[22] Filed: Aug. 23, 1996

Related U.S. Application Data

[63] Continuation-in-part of application No. 07/847,920, Mar. 6, 1992, Pat. No. 5,557,656.

[51] Int. Cl.⁶ .................................................. H04Q 7/22

[52] U.S. Cl. ........................ 455/431; 455/436; 455/562

[58] Field of Search ................................ 455/431, 436, 455/562, 25; 343/713, 742, 890; 342/350, 351, 352, 357, 385, 389, 450

[56] References Cited

U.S. PATENT DOCUMENTS

| | | | |
|---|---|---|---|
| 4,297,707 | 10/1981 | Brunner et al. | 343/725 |
| 4,747,160 | 5/1988 | Bossard | 455/562 |
| 4,800,389 | 1/1989 | Reger et al. | 342/175 |
| 5,212,804 | 5/1993 | Choate | 455/431 |
| 5,444,762 | 8/1995 | Frey et al. | 455/431 |
| 5,455,964 | 10/1995 | Roos et al. | 455/431 |
| 5,519,761 | 5/1996 | Gilhousen | 455/431 |
| 5,557,656 | 9/1996 | Ray et al. | 455/431 |

Primary Examiner—Dwayne D. Bost
Assistant Examiner—Jean A Gelin
Attorney, Agent, or Firm—Wendell Coffee; Mark E. Scott

[57] ABSTRACT

A slotted wave-guide antenna is attached low on a cellular phone tower. Horizontally polarize radiation in a toroidal pattern from the wave-guide antenna is used to communicate with aircraft. The wave-guide antenna radiation pattern is about 6° thick. An antenna on top of the tower transmits vertically polarized radiation to communicate with automobiles and pedestrians.

15 Claims, 2 Drawing Sheets

MOBILE COMMUNICATIONS

CROSS REFERENCE TO RELATED APPLICATION

This is a continuation in art of patent application Ser. No. 07/847,920 filed Mar. 6, 1992 now U.S. Pat. No. 5,557,656. Jimmy C. Ray is joint inventor of both applications which are owned by Air Cell, Inc.

BACKGROUND OF THE INVENTION (1) Field of the Invention

This invention relates to mobile telecommunications and more particularly to communications which are automatically relayed to mobile stations from ground station to ground station according to the cellular system. Also specifically all systems described are suitable for aircraft.

(2) Description of the Related Art

This invention is described in relation to North American cellular systems. wherever, its teachings are equally applicable to other cellular systems such as GSM, NMT, and others used Worldwide.

North American cellular radio telephone service, primarily for automobiles or other land vehicles, currently uses a designated plurality, of radio channels namely a set of 832 radio channels in the Ultra High Frequency (UHF) radio band. As used here, "channel" means a pair of Ultra High Frequencies in the designated band. One frequency of the pair in a channel is called the "forward" carrier used for transmission from the base to the mobile, and the other frequency of the pair in the channel is used for transmission in the "reverse" direction from the mobile to the base. Two competitive operators in each service area each use 416 channels. Most present technology utilizes analog Frequency Modulation (FM radio) as the method for transmitting the speech, with a 30 kHz frequency channel spacing.

Cellular systems allow more conversations simultaneously in the same service area (e.g., city) than there are channels, because the radio channels are "re-used" at several different base radio locations in the overall service area. The cellular system divides up the service area into a number of cells. Each cell includes a base transmission station or tower. The radius of the cell will be basically the distance from the base tower that good reception is assured between the tower and the mobile station. Therefore it may be seen that if the entire area is covered numerous cells are required. The arrangement of the cells is often considered to be somewhat like hexagonal tiles covering the entire service area, however, it will also be understood that there is a border area between two cells where transmission and reception are about equal, or if not equal, are acceptable from either of two or three different base stations (sometimes called towers herein). The cell diameter would be approximately twice the cell radius which would be the distance of dependable transmission and reception. A widely used typical layout includes seven "cells," wherein a fraction of the total radio channel numbers can be used in each cell. Other arrangements are also used, but this discussion will describe the seven cell as a specific example.

In a completely set-up system, there are 416 radio channels available for each of the two competing operators in a service area (e.g., in Dallas-Fort Worth, Metrocell has 416 channels and Southwestern Bell Mobile Systems has another 416). Of these 416, 21 are reserved for sending call processing messages (or control) only and are not used for voice. The remaining 395 channels are divided into seven groups of approximately 56 channels each when used with a seven cell layout plan.

It will be understood that with a group of seven cells, any particular tower would be less than three radii in distance from about ⅔ of the mobile stations in other cells, and therefore potentially interfering. However, it will also be understood that with seven cells there would be one center cell with six other cells grouped around it. If additional cells were added it will be understood that mobile stations in each additional cell could be spaced at least more than five radii distant from any cell base station using the same channel; and therefore in a location where the potentially interfering signal strength would be very weak. Therefore the additional cell base stations could use the same radio channel as the cell whose border was more than five radii away.

Each cell represents the coverage area of a different base station antenna, based on radio signal power compared to interference from other base stations in the city using the same radio channels. For FM radio with 30 kHz band-width, it is known from extensive testing that the effective operational boundary of a cell is determined by the approximately circular boundary where the desired radio signal is stronger than the interference from other cells by a ratio of approximately 64 to 1. In radio jargon, this ratio is usually expressed by means of the logarithm of the power ratio, and is thus 18 decibels (dB). Real cells are often far from circular in shape due to irregularities in terrain, the effect of buildings and trees, etc. Other arrangements of the radio channels, using directional antennas rather than the omni-directional (circular pattern) cells are also used in some areas with very high subscriber densities. In the outermost cells of a service area, where there are no other cells beyond the edge of the service area, the outer perimeter of an individual cell is determined by the locations where the signal strength is 18 dB stronger than the interfering radio "noise" level in the receiver due to irreducible physical and device electrical random "noise."

The actual diameter of the cells in real systems, depending upon antenna height and base station radio transmitter power, varies by design from as little as about 5 km (3 mi) to as much as about 40 km (25 mi). The objective when designing an effective cellular system is to ensure that interfering radio signals on the same radio frequency throughout each cell remain weaker than the desired signal by this ratio of 18 dB.

Each cell contains a radio channel for control messages (called a setup or a control channel) in addition to the voice conversation channels referred to above. The control channels are generally taken from the pool of 21 channels legally reserved for that purpose. When a call is initiated, a sequence of special digitally coded messages are exchanged between the base and mobile radios on the control channel to locate and identify the mobile subscriber, and to determine what telephone number the mobile subscriber dialed when the call is originated by the mobile subscriber. The last message of the sequence directs the mobile radio to re-tune to an available voice channel for the purpose of conversation. During the conversation, the voice channel may be very briefly interrupted to transmit messages between the mobile and the base. These brief interruptions (typically only two tenths of a second and typically called "packets" or "information packets") cause minor, often unnoticed, interruptions of the speech. The major reasons for sending such messages from the base to the mobile radio are to remotely control the mobile radio transmit power and to change the mobile radio frequency channel when required for a handoff.

The mobile transmitter power must be controlled because the mobile transmitter needs to put out more radio frequency power to reach the base station receiver with a strong signal when it is at the outer boundary of a cell than when it is near the base receiver antenna at the center. Lower power is used at or near the center of the cell to prevent excessive interference with other cells. As a mobile moves from the center of a cell to the outer perimeter, the base may command it to increase power in as many as eight steps, designated as Power Levels zero through seven (PL0 through PL7), with PL0 being the maximum.

Consider the station when the mobile approaches the outer perimeter of the cell. The radio signal received at the base station will decrease still more when the mobile set moves further away, and if the mobile transmitter is already set at PL0, the signal level cannot be increased any further by increasing the mobile transmitter power. At this point it is usual to begin a handoff process. First the base system causes a tunable "locating receiver" in each of the six neighboring cell base stations to tune to the mobile transmitter frequency of the mobile which has reached the handoff radio signal strength level. The measurements of radio signal strength in the six neighboring cells are compared, and the strongest one is chosen as the handoff target cell. If there is an available voice channel in that cell, the mobile unit is sent a command message to re-tune to that frequency, and simultaneously the voice connection is switched over to the proper radio channel base unit in the target cell by means of a special central telephone exchange switch which is connected to all the cells and also connected to the public telephone network. This special switch is known as a Mobile Switching Center (MSC) or a Mobile telephone Switching Office (MTSO).

A potential major problem of cellular mobile stations in aircraft in flight is the high level of interference which the mobile set can cause to numerous cells in a city when it operates in an aircraft. This problem and the invention to overcome this problem is explained further below. Another problem is the high level of noise interference received by the mobile airborne receiver.

SUMMARY OF THE INVENTION (1) Progressive Contribution to the Art

This invention is particularly designed to provide a cellular system for aircraft. Two of the problems with aircraft cellular phones is rapid movement and altitude of aircraft. The radio signal from aircraft would cause interference with signals from ground mobiles unless special procedures and equipment are used.

This is partially solved for aircraft by having directional antenna on the towers or stationary transmitters so as to direct their radiation and reception above ground level. The aircraft transmission is designed to direct a beam so that there is a minimum interference with the ground and also so that it will reach aircraft for many miles, then an effective range of about 125 miles may be obtained for each tower. This would mean that the cells could be approximately 200 miles in diameter. The large cell diameter would reduce the problem of rapid movement of the aircraft from one cell to the other.

As used herein the term "radiation pattern" shall mean not only the pattern of radiation from a transmitting antenna but also the reception pattern of receiving antenna. Where one antenna is used for both transmission and reception these patterns will be identical. Where there are perhaps two antennas, although the patterns might not be identical but they will be substantially similar and therefore the term as used here "radiation pattern" means both pattern of transmission and reception. The total radiation of air antenna on towers includes a principal radiation pattern or lobe and secondary side lobe radiation. The secondary radiation will not be a concentrated beam or lobe but will approach being omni-directional and much weaker than the principal radiation pattern.

The air antennas are located as low as possible on the tower. This reduces the length of cable and thus the amount of cable loss from the antenna to the receiver which is located in a base station building near the tower. Also, as explained later, the radiation patterns achieved are better from a antenna near the ground level rather than elevated.

The ideal radiation pattern would be a disk-shaped radiation pattern extending for a radius of 125 miles or more from the tower. Ideally the tower would be the axis of a cylindrical disk with the 125 mile or greater radius. The radiation pattern ideally would be from 5,000 feet above ground level (AGL) and would extend upwards to a top of 40,000 feet above mean sea level (MSL). Although the ideal cannot be achieved the goal is to reach as close as possible to that ideal.

To solve the problem of the transmission from the aircraft interfering with ground reception receivers, the transmission power of the aircraft is reduced so that the power output is substantially lower than the power output from any ground vehicle mobile station. When the aircraft radio transmission power is sufficiently low the power received by the base receivers would be below that from any ground vehicles. The reception antenna at the base station for the aircraft are designed to be particularly directional and high gain so that they can receive the very weak signals. Also, since they are pointed skyward, they would be directional skyward and not pick up the ground vehicles signals. Both the transmission and reception air antenna at the base station have this highly directional characteristic (sometimes called radiation pattern) to achieve this result. The radiation pattern will be toroidal.

The mobile air transmitters will be limited to 500 milliwatts (ERP referred to a two dB dipole) maximum output by government regulation whereas mobile ground transmitters will always transmit with more than 600 milliwatt output.

Another means of reducing the reception of automobile or ground transmission at the tower is by a different polarization of antenna. This produces a radio wave with different polarization of the electromagnetic field. I.e., the ground cellular systems in common use today use vertical polarization both on the towers and on the mobile stations or ground vehicles. Therefore horizontal polarized antenna are used for transmission and reception both at the base station and the aircraft, the base antenna would be less effectively coupled to the automobile vertical antenna; also the reception of the aircraft transmissions would be better because of the advantages of having the transmitting and reception antenna similarly oriented.

Also to prevent interference, ground mobile cellular stations are controlled by base stations to prevent the mobile stations from transmitting radio signals as designated air cellular radio channels within 20 miles of a base station using said designated air channels. Beyond 20 miles the ground mobile station will have weak signals or will be beyond the horizon (or out of line of sight) from the air receiving antenna at the base station.

As used herein "miles" shall mean nautical miles.

The system basically is completely compatible with the ground system. I.e., each of the mobile stations transmits an identification code so that the signal strength of the identification code can be used to determine which base antenna would be in communication and control of the mobile station. Also, the control could be transferred from one antenna (base station) to the other in a similar fashion.

(2) Objects of this Invention

An object of this invention is to make cellular communications available to aircraft, particularly to aircraft between 5,000 feet AGL and 40,000 feet MSL.

Another object of this invention is to improve cellular communications to all mobile stations.

Another object is to accomplish the above with the prevention of harmful radio interference.

Further objects are to achieve the above with devices that are sturdy, compact, durable, lightweight, simple, safe, efficient, versatile, ecologically compatible, energy conserving, and reliable, yet inexpensive and easy to manufacture, install, operate, and maintain.

Other objects are to achieve the above with a method that is rapid, versatile, ecologically compatible, energy conserving, efficient, and inexpensive, and does not require highly skilled people to install, operate, and maintain.

The specific nature of the invention, as well as other objects, uses, and advantages thereof, will clearly appear from the following description and from the accompanying drawings, the different views of which are not necessarily scale drawings.

BRIEF DESCRIPTION OF DRAWINGS

FIG. 3 is a side elevational view of the attachment of air antennas to a tower according to this invention.

CATALOG OF ELEMENTS

As an aid to correlating the terms of the claims to the exemplary drawing(s), the following catalog of elements and steps is provided:
8 Ground level
10 Tower
12 Ground Antenna
14 Air Antenna Rx
16 Air Antenna Tx
18 Cable
20 Air Receiver
22 Air Transmitter
24 Ground Receiver
26 Ground Transmitter
28 Control and Switching
30 Mobile Switching Center
32 Principal Radiation Pattern
34 Scattered and secondary Pattern
36 Lower Level
38 Top Level
40 Line of Sight Horizon
42 Structural Members

DESCRIPTION OF THE PREFERRED EMBODIMENTS

Figure 1:
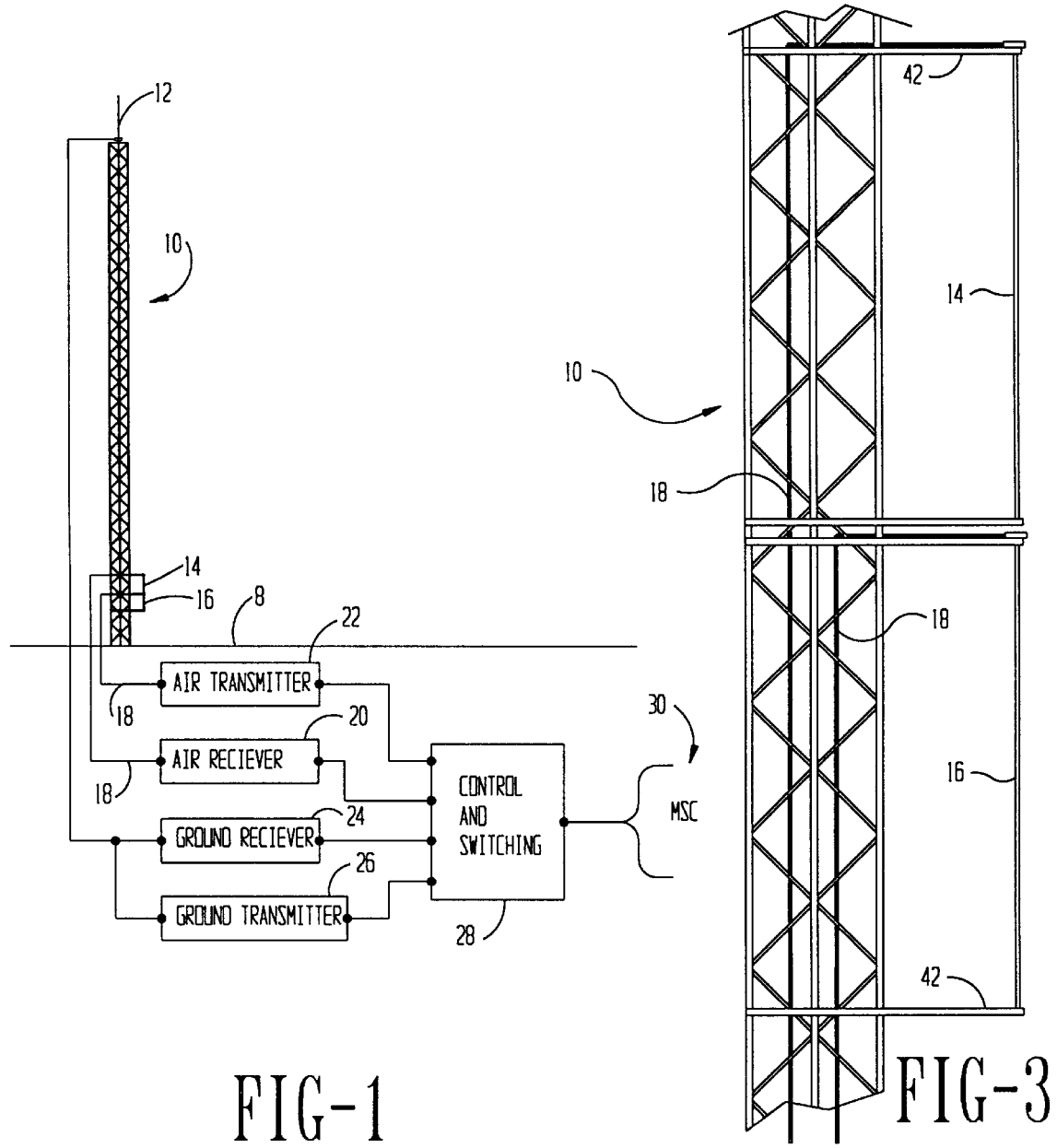
FIG. 1 is a schematic representation of a base station with tower according to this invention.

Referring to the drawing FIG. 1 one tower 10 is used for both ground cellular systems and air cellular systems. Ground antenna 12 for transmitting and receiving is at the top of the tower. It is desired to have the ground antennas to the top of the tower in as much as they are transmitting to and receiving from mobile stations which are located upon the ground. The range is limited to a line of sight from the antenna. The higher the antenna is the greater the range of the radiation pattern of the ground antenna will be. Therefore it is desirable that the ground antenna be as high as economically feasible. Other considerations may limit the height of the ground antenna. For example in a very dense population where there are many ground cellular users in a area; it may be desired to have the range of any particular ground tower to be less than what would otherwise be their maximum range. Also the cable loss due to thermal noise and by $I^2R$ loss negatively effect a carrier and noise level.

The radiation pattern of the ground antennas will normally not be above the horizon. That is to say, it would be from the horizon downward. The ground stations in communication with the tower will be on the ground and the radiation pattern above the horizon would have no useful purpose.

On the other hand air antennas 14 and 16 are mounted as low as feasible upon the tower 10. There are conditions which would limit them being very close to the ground. For example, there may be various buildings or structures or topographical hills or mountains which would project upward. Therefore it is desirable that the radiation of the air antenna not be subject to undue interference. Also, it is desirable to place them so that the antennas are not readily accessible to mischievous damage.

One of the advantages of placing the air antennas as near as possible is so that the reception antenna can handle extremely weak signals. Lower antenna location results in less cable length extending from the antenna to the air receiver therefore less cable loss and less thermal noise.

The air antennas are mounted to have a toroidal principal radiation pattern directed above the horizon. As pointed out above that the normal use of the air cellular mobile phone will be 5,000 feet AGL therefore the air antennas are directed above horizontal.

It is desired if possible to have an air radiation pattern with as long a range as possible. If the towers are 200 miles apart and the target range for reception from a base antenna is 5,000 feet AGL it is desirable that the radiation pattern not exceed 5,000 feet for 125 miles. Thus, there would be no dead spots at 5,000 feet AGL and immediate higher altitudes.

As a practical matter has been found desirable that if the radiation pattern has negligible or very little radiation below about 1° above horizontal. Also any radiation that occurs below about 1° horizontal results in undesirable multipathing of the signals.

Therefore the reception of air signals by ground mobile stations is reduced in as much as there is always a negligible transmission to the ground level. The radiation pattern extends above the ground both because of the curvature of the earth and the upper angle of the radiation pattern.

Figure 2:
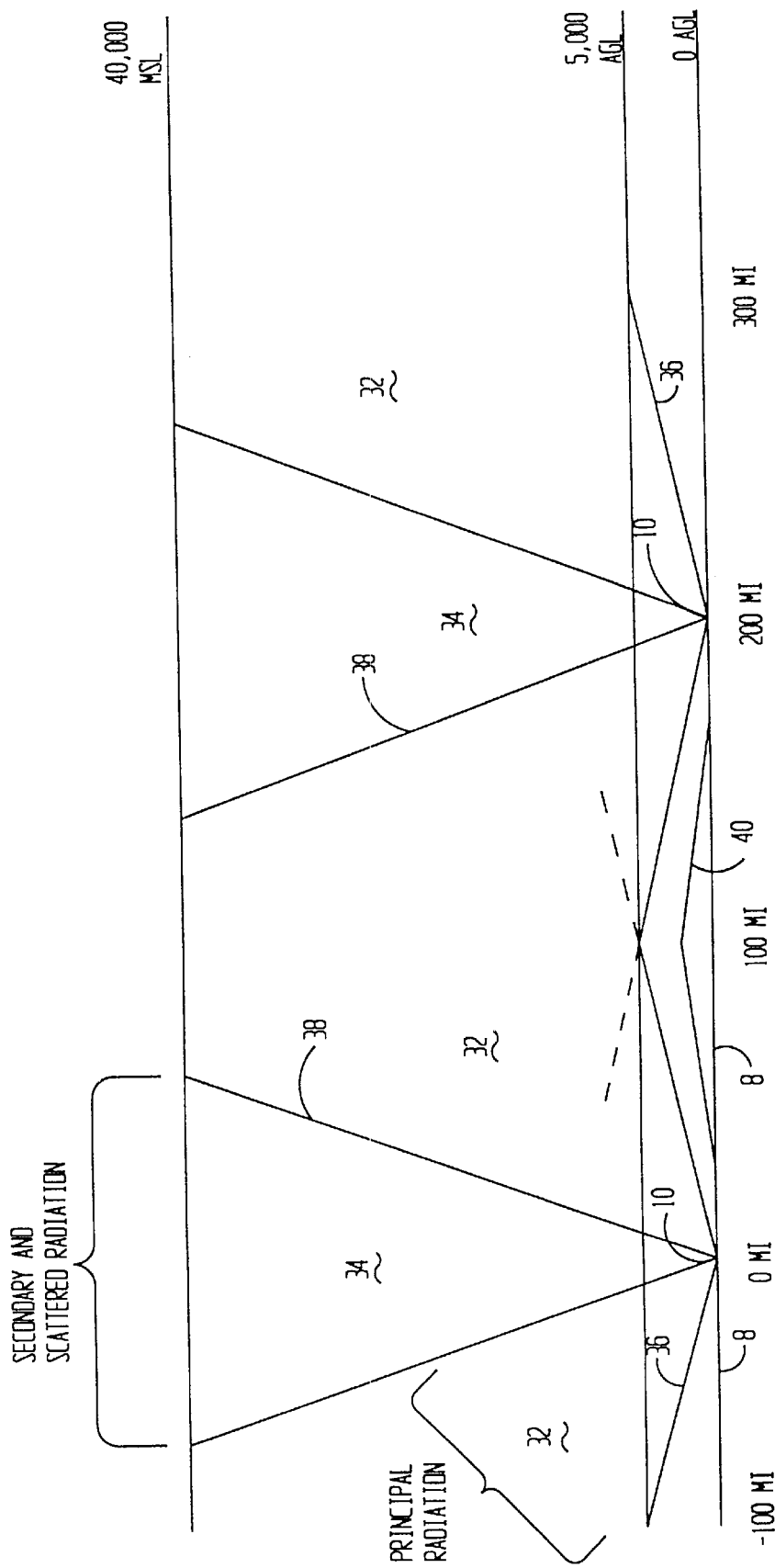
FIG. 2 is a schematic representation of the air radiation patterns for towers according to this invention.

FIG. 2 shows the two towers 10 having air antenna on them. The principal radiation pattern 32 from each tower will have a lower level 36 and an upper or top level 38. The vertical scale of FIG. 2 is 24 times greater than the horizontal scale. For example the 5000 ft. AGL line is shown as the same distance vertical from ground as 20 miles (120,000 ft) along the ground. The lower level 36 extends from the tower 10 at about 1° above horizontal. Also a Zenith directed antenna forming a second cell directly overhead is useful. This Zenith directed antenna is preferably a helical antenna.

"About 1° above horizontal" is used in this patent application to mean that a signal to or from the tower 10 has sufficient strength to be usable at 5,000 feet AGL, 100 miles from the tower.

Also the line of sight horizon 40 has been shown schematically on FIG. 2. This shows the absence of interference between ground mobile station and the towers 10 below the line of sight horizon.

It has also been found that an upward angle for the top level 38 of the principal radiation pattern 32 of about 7° is suitable. That is to say that to make the antennas extremely directional so that the power of transmission is within a narrow width. (As used here the term "width" means the vertical thickness of the radiation pattern which would be the distance from lower level 36 to top level 38). Calculations will show that if width of the pattern is about 6° that 80 nautical miles from the tower that the thickness will be about 50,000 feet. Also, by the same calculation at 40 miles from the tower the thickness would be about 25,000 feet or about 29,000 feet AGL.

Although this is the principal radiation pattern; there is a certain amount of secondary and scattered radiation 34 that there will be outside of the principal radiation pattern 32. Therefore although the radiation pattern might not reach to a desired altitude of 40,000 feet at forty miles, experience has shown that there is sufficient secondary and scattered radiation above the top level 38 that it results in a receivable signal. This is partly because 40 nautical miles from the tower is relatively near the tower and therefore the secondary and scattered radiation has not weakened excessively.

It will be understood that normally the air antennas 14 and 16 will be mounted on towers that are not heavily used. For example, there are many ground antennas in sparsely populated areas (open countryside) with only a few residential buildings for several miles in any direction. It is because of the low usage that such a ground station would have the available cellular channels to be used for air cellular channels. In such a situation there would be little or no interference to an air antenna 14 and 16 which was located 25 foot off the ground. Also it would be understood that the way the air antennas 14 and 16 are mounted that they would extend over a vertical distance of about 25 feet.

Of course there may be many exceptions to the rule but as a normal rule of thumb it would be undesirable to have any portion of an air antenna less than 15 feet off the ground. Therefore that is a normal situation that at least a portion of the ground antenna will be above 40 feet above ground level. Also that it would be an extremely rare situation where it was desirable that the air antenna be placed high up on the tower. At least a portion of the antennas 14 or 16 is below 100 foot elevation above the ground. Also in such a situation to obtain the maximum range the ground antenna 12 would be normally above a 200-foot range.

In addition, if the antennas are closer to ground level it makes the antennas more accessible for routine maintenance. Also, since the air cellular signals received at the tower are extremely weak, it is desired that they have little attenuation by cable loss form the antenna to the receiver.

FIG. 3 shows the mounting of the modified guide antenna to the tower 10. It has been found that SCALA Model #SL11-915/DT4, manufactured by Scala Electric Company, Medford, Oreg., operate to conform to the radiation patterns as shown in FIG. 2 for commercial usage. As may be seen in FIG. 3 the receiving antenna is placed vertically and coaxially with the transmitting antenna. The two antennas together from top to bottom will measure about 25 feet. They will be less than about 2" in diameter and are attached to the tower 10 by conventional horizontal structural members 42 such as metal angle members. The antenna are mounted about three feet from the tower which would be about one wave length. Alternatively the antennas are mounted at least ten feet from the tower to minimize any reflection or blockage effect of the tower. The antennas are each connected by their respective cables 18 at the top of each of the antennas.

Basically the tower has very little interference with the radiation pattern. There will be a certain amount of scattering caused by the tower and this will together with secondary radiation will provide part of the secondary and scattered radiation pattern 34 which is above the top level 38 of the principal radiation pattern 32.

The embodiment shown and described above is only exemplary. I do not claim to have invented all the parts, elements or steps described. Various modifications can be made in the construction, material, arrangement, and operation, and still be within the scope of my invention.

The restrictive description and drawings of the specific examples above do not point out what an infringement of this patent would be, but are to enable one skilled in the art to make and use the invention. The limits of the invention and the bounds of the patent protection are measured by and defined in the following claims.

We claim as our invention:

1. The method of preventing interference between ground vertical polarized cellular communication radio transmitted signals and air cellular communication radio transmission signals at a tower wherein the improvement comprises the step of:

a) horizontally polarizing said air cellular signals, and b) directing said air horizontal polarized cellular communication radio transmission signals in a principal radiation pattern higher than 1° above horizontal.

2. The method as described in claim 1 with the additional limitation of:

restricting the power of air cellular communication radio transmissions originating from an air mobile station to a maximum power less than the power from ground cellular communication radio transmissions originating from a ground mobile station.

3. The method as defined in claim 1 with the additional limitation of:

preventing ground mobile cellular stations from transmitting radio signals on said designated air cellular radio channels within a designated distance of a base station using said designated air cellular radio channels.

4. The method as defined in claim 3 wherein said designated distance is 30 miles.

5. In combination with structure of a cellular ground base station, having a) a tower with the top above ground level;

b) having a ground communications antenna mounted thereon;

c) said ground communications antenna electronically connected to ground transmitters and receivers operable on voice channels; and d) said ground transmitters and receivers connected at said base station to ground means for switching and controlling operation of the ground transmitters and receivers;

e) said means for switching and controlling responsive to information received by the said ground communications antenna from ground mobile stations and also responsive to information received from ground cellular base stations;

the improved structure for air cellular base station operation comprising:

f) at least one air antenna for communicating with air mobile stations mounted on the tower, g) said air antenna being mounted at a height below the height of said ground antenna, h) said air antenna connected at the base station to air receivers and transmitters;

i) said air antenna designed to have a directional principal radiation pattern;

j) said directional principal radiation pattern being above horizontal.

6. The combination as defined in claim 5 further comprising:

said air receivers and transmitters connected to said means for switching and controlling.

7. The combination as defined in claim 5 wherein:

said ground antenna are vertically polarized and said air antenna are horizontally polarized.

8. The combination as defined in claim 5 wherein:

said air antenna have a principal radiation pattern above approximately 1° above horizontal.

9. The combination as defined in claim 5 wherein:

said air antenna having a principal radiation pattern centered approximately 4° above horizontal.

10. The combination as defined in claim 5 wherein:

said air antenna have a principal radiation pattern approximately 6° thick.

11. The combination as defined in claim 5 wherein:

said air antenna is a modified slotted wave-guide antenna.

12. In combination with structure of a cellular ground base station, having a) a tower with the top above ground level;

b) having a ground communications antenna mounted thereon;

c) said ground communications antenna electronically connected to ground transmitters and receivers operable on voice channels; and d) said ground transmitters and receivers connected at said base station to ground means for switching and controlling operation of the ground transmitters and receivers;

e) said means for switching and controlling responsive to information received by the said ground communications antenna from ground mobile stations and also responsive to information received from ground cellular base stations;

the improved structure for air cellular base station operation comprising:

f) at least one air antenna capable of communication with air mobile stations mounted on the tower;

g) said air antenna being mounted at a height below the height of said ground antenna;

h) said air antenna connected at the base station to air receivers and transmitters;

i) said air antenna designed to have a directional principal radiation pattern;

j) said directional principal radiation pattern being above horizontal; and k) portions of said ground antenna being mounted more than 200 feet above the ground; and l) a portion of said air antenna being mounted more than 40 feet above the ground and less than approximately 100 feet above the ground.

13. The combination as defined in claim 12 further comprising:

m) said air receivers and transmitters connected to said means for switching and controlling, n) said ground antenna are vertically polarized, o) said air antenna are horizontally polarized, p) said air antenna have a principal radiation pattern lobe above approximately 1° above horizontal, q) said air antenna having a principal radiation pattern lobe centered approximately 4° above horizontal, r) said air antenna have a principal radiation pattern lobe approximately 6° thick, s) said air antenna is a modified slotted wave-guide antenna, and t) said air antenna having a total radiation including secondary radiation in addition to said principal radiation pattern, said total radiation having reduced strength above approximately 40,000 feet above mean sea level.

14. The method of preventing interference between ground vertical polarized cellular communication radio transmitted signals and air cellular communication radio transmission signals at a tower wherein the improvement comprises the step of:

a) horizontally polarizing said air cellular signals, b) directing said air horizontal polarized cellular communication radio transmission signals in a principal radiation pattern higher than 1° above horizontal, and c) mounting a ground antenna on said tower and mounting an air antenna on said tower at a height below said ground antenna.

15. In combination with structure of a cellular ground base station, having a) a tower with the top above ground level;

b) having a ground communications antenna mounted thereon;

c) said ground communications antenna electronically connected to ground transmitters and receivers operable on voice channels; and d) said ground transmitters and receivers connected at said base station to ground means for switching and controlling operation of the ground transmitters and receivers;

e) said means for switching and controlling responsive to information received by the said ground communications antenna from ground mobile stations and also responsive to information received from ground cellular base stations;

the improved structure for air cellular base station operation comprising:

f) at least one air antenna capable of communication with air mobile stations mounted on the tower;

g) said air antenna being mounted at a height below the height of said ground antenna;

h) said air antenna connected at the base station to air receivers and transmitters;

i) said air antenna designed to have a directional principal radiation pattern;

j) said directional principal radiation pattern being above horizontal; and k) said air antenna having a total radiation including secondary radiation in addition to said principal radiation pattern, said total radiation having reduced strength above approximately 40,000 feet above mean sea level.

* * * * *